Feb. 18, 1969  H. HAAS  3,427,886
PROCESS AND APPARATUS FOR THE DETERMINATION
OF PARTICLE SIZE DISTRIBUTION
Filed Feb. 16, 1966

INVENTOR
Hans Haas
BY
Burgess, Dinkeage & Sprung

United States Patent Office 3,427,886
Patented Feb. 18, 1969

3,427,886
PROCESS AND APPARATUS FOR THE DETERMINATION OF PARTICLE SIZE DISTRIBUTION
Hans Haas, Hoffnungsthal, near Cologne, Germany, assignor to Strabag Bau-A.G., Cologne-Deutz, Germany, a corporation of Germany
Filed Feb. 16, 1966, Ser. No. 527,805
U.S. Cl. 73—432                  9 Claims
Int. Cl. G01d 21/00; G01p 1/02

ABSTRACT OF THE DISCLOSURE

Particle size distribution in terms of the amount of the material below a selected particle size is determined by taking the under-liquid weight of a sample of the material and the under-liquid weight of the particles in a settlement sample (obtained by suspending a sample, letting the sample partially settle and then taking the settlement sample), and then calculating the amount below the selected particle size.

The invention concerns a process and apparatus for the determination of particle size distribution of the fine grain material, e.g. granular building materials, in which a sample is weighed and then suspended and allowed to stand for settling. After a predetermined time, at a specific depth of the sedimentation vessel, a suspension sample of specific volume is drawn off and the weight of the solid constituents of this suspension sample is measured and compared with the total weight of the building material sample. Stokes' law can be used for an indication of the size of the particles in the suspension sample.

In a known process of this kind, which is known as the "pipette method," the suspension sample taken is dried and its solid constituents are weighed on a sensitive scale. Such a process has the disadvantage, that for each analysis a comparatively long time is necessary, since the period of sedimentation amounts to several hours, and also for the drying and weighing of the fine particles contained in the suspension sample a considerable time is required. Moreover, such a sedimentation analysis requires particular sedimentation devices, drying devices and weighing devices, so that in practice, the process can be carried out only in the laboratory.

Other processes for the definition of the fine particle constituent of granular materials are sedimentation analysis using a sedimentation scale, and the so-called "light extinction method." In both processes it is a question of testing in the laboratory of the grain size of the finest grain particles with a grain diameter smaller than 0.05 mm., which is not suitable for the testing of granular building materials which are to be embedded in earth work. The precision of the measurement according to the light extinction method is, however, doubtful, since only a very small specimen is obtained and evaluated. Moreover, the expenditure of time and work is considerable.

The problem which is the concern of the invention is to develop a process for the testing of the fine grain constituent of granular building materials, which may be carried out with simple devices at the building site itself. In this connection, it is to be considered that at earth work and road construction sites, daily, several hundreds of trucks deliver the granular building materials, and as a rule the materials are obtained in various gravel pits or excavation sites. The composition of these granular building materials, particularly their portion of binding constituents, if of decisive importance for the permeability, resistance to freezing and stability of the earth work and road constructions. Therefore, the composition of the materials delivered must be continuously supervised. In this connection, it is essential that the testing of the building material samples be performed quickly so that the handling of the building materials is not delayed.

In the testing of the grain composition, it is, in general, sufficient to determine the total constituent of the fine grain below a certain grain size and commonly it is not essential to ascertain the particle size distribution in the fine grain constituent itself. Therefore, it suffices for the test, if the quantity of fine grain constituent with a grain size of, for example, smaller than 0.06 mm., can be determined.

For such a test, at a construction site, the so-called "Areometer-Process" is known. An areometer is immersed into an aqueous suspension of the construction materials to be tested. However, this known process includes inaccuracies, which follow from the fact that during the test, material deposits at the upper side of the areo-sphere and produces a systematic error. Moreover, this process is time consuming and hence is not well suited for the test at the construction site.

In another known process, a sample of granular building materials is suspended in a measuring cylinder, wherein to the suspension material is added guide grain of different color, which becomes grouped into the grain classes of the suspension material, and which makes it possible to determine the grain size limits of the sedimentation layers being deposited. This known process is inaccurate and time consuming. In order to be able to determine the amount of fine grain constituent of a building material sample, it is necessary to wait until all grain groups have settled in the sedimentation vessel. This takes about 24 hours. The inaccuracy follows from the fact that not the weights but the volumes of the individual grain groups are measured, the stratification density of which is variable and depends on the shape of the grains. Therefore, this known process is unsuitable for the solution of the problem forming the basis of the invention. The time requirement is excessive and the results are not accurate, if it is only desired to determine a grain size range, e.g. the fine grain constituent, smaller than 0.06 mm.

It is the task of this invention to avoid these disadvantages and to provide a process, with which it is possible to ascertain with the greatest precision at the construction site itself, with simple devices, within the shortest time, measuring values for the definition of the fine grain constituent below a specific grain size of granular building materials.

This objective of the invention is attained, in accordance with the invention, by determining the under-water weights of a sample of the material, and of the solid constituents of the suspension sample.

With this process in accordance with the invention, it is possible to determine within five to ten minutes the fine grain constituent of a building material sample with a precision which approaches the precision of the known tests in the laboratory. Through suitable selection of the size of the devices used for the carrying out of the process in accordance with the invention, the measuring precision may be increased as desired so that it is possible to attain the degree of precision of the test in the laboratory, or even to surpass it.

Even though in construction site use the determination of the amount of material smaller than a particular size suffices, yet it is possible to repeat the process in accordance with the invention as often as desired, in order to determine a particle size distribution with reference to several grain sizes, if this should prove desirable.

In accordance with the invention, the under-water weights are determined by immersion weighing. The carrying out of the immersion weighing is also possible without difficulties at the construction site, since for this only a simple vessel or hydrometer, which can be immersed in a pail of water, is necessary.

By under-water weight is meant the weight of the material (sample of the material analyzed or of the particles thereof which are suspended and weighed) less the weight of an equal volume of water.

The influence of the temperature of the water may easily be eliminated by employing the same water bath for immersion of both the sample of the material and the suspension sample. The period required for measurement is about 10 minutes and the temperature does not measurably change during this period. Likewise, a temperature change in the sedimentation vessel in which the sample is suspended is not then to be expected, if it is sufficiently large. Anyway, its influence on the measurement precision is very slight.

In accordance with the invention, for the determination of the under-water weight of, for example, a sample of building material, a measuring vessel is filled up to a specified level with the material. Then the measuring vessel is filled up with water so that the construction material sample is saturated with water, i.e. the water fills the voids in the material and rises only up to the level of the building material. Subsequently the measuring vessel is immersed in a water bath, and the under-water weight is read from a scale on the measuring vessel as difference of the immersion depth of the measuring vessel filled with the water saturated construction material sample, compared with the immersion depth of the measuring vessel filled up to the same height with water. For the determination of the under-water weight of the solid constituents of the suspension sample, a sample of the suspension is filled into a hydrometer and this is immersed into the same water bath, whereupon the under-water weight of the solid constituents of the suspension sample is read from a scale graduation of the hydrometer as difference of the immersion depth of the hydrometer filled with suspension, and the immersion depth of the hydrometer filled with the same quantity of water.

Accordingly, in the process of the invention, use is made of the Stokes' law, according to which all grains of a granular material suspended in water, settle with a variable speed which is dependent on the diameter of the individual grains. According to the Stokes' law it may then be determined to which horizon all grains have sunk down within a specific time, which exceed a specific threshold value. Above this horizon then are still only present fine materials, which are smaller than this threshold value.

From measuring values read on the measuring scales, i.e. from the under-water weight of the given sample on the one hand, and from the under-water weight of the fine solids still contained in the suspension on the other, may then in simple manner be determined the proportion of the fine materials below a quite specific grain size to the total material sample. In this determination the basis is that the specific weight of the coarse and fine constituents of the material to be tested are equal, and that because of equal temperatures the specific weight of the water in the water bath and the water in the suspension are the same.

A cylindrical measuring vessel which is provided with a level marking for the sample and water can be used for the material sample. Above this marking, a scale can be provided for the determination of the under-water weight through ascertaining the immersion depth of the measuring vessel in a water bath. Appropriately, the water depth is of such size that the same bath may be used to determine the under-water weight of the starting sample and also that of the suspension sample.

Thus, the invention provides a process for determination of particle size distribution in a finely divided material, with reference to a selected particle size. A sample of the material is weighed, and a sample of the material is suspended in a liquid and the resulting suspension is allowed to stand for settling of suspended particles for a predetermined time. A sample of predetermined volume of the suspension is taken in a predetermined level and the weight of the particles in said suspension sample is determined and compared with the weight of the said sample of the material. According to the invention, the under-water weight of said sample of the material, and the under-water weight of the suspension sample is determined. Desirably, these under-water weights are determined by immersion weighing.

In the accompanying drawing, the devices which can be used in the process of the invention are shown.

Figure 1:
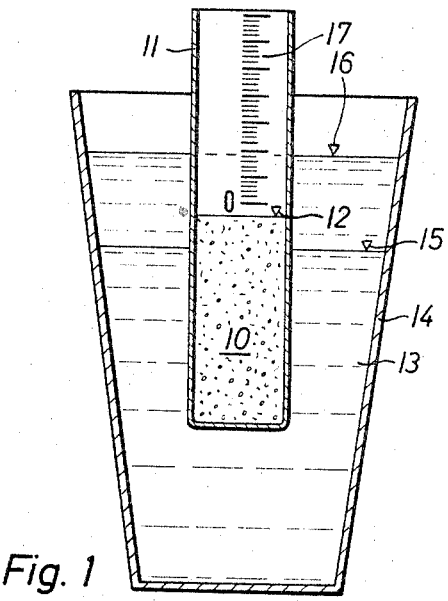
FIG. 1 shows a water vessel for immersion weighing and vessel for the material sample.
Figure 2:
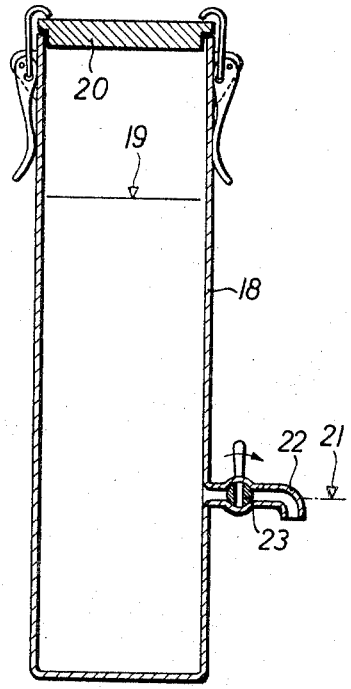
FIG. 2 shows a settling vessel.

A measuring vessel 11 is filed up to the height marking 12 with a sample 10. Then, since the under-water weight of the sample is to be ascertained, water is poured into the container 11 to fill the container to the level marking 12, so that the sample as a whole is under water. In this, care is to be taken that no air bubbles remain adhering to the sample 10. Such air bubbles would necessarily lead to erroneous measuring results. The mark 12 on the vessel 11, is the level to which the vessel is filled with the sample and with water. The lower end of the scale 17 commences at the level at which the vessel floats when filled with water to the level 12.

The measuring vessel 11 is then immersed in a water bath 13. The vessel 11 sinks, as is known according to the Archimedean principle, to a specific depth into the water 13. This depth is dependent on size and weight of the vessel 11 and the contents of the measuring vessel 11. The liquid surface rises from 15 to 16 and the level at 16 indicates on the graduation scale 17 a number which corresponds to the under-water weight of the sample 10. The scale 17 can be formed so that under-water weight is read directly.

Figure 3:
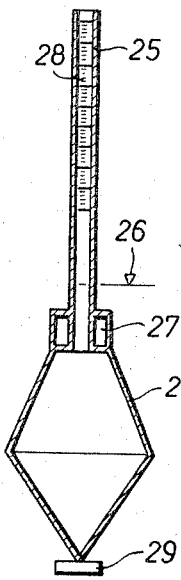
FIG. 3 shows a vessel for the ascertaining of the underwater weight of the fine particles.

After the under-water weight of the sample of the material has been ascertained, the contents of the measuring vessel 11 is transferred into the cylindrical vessel 18. The water surface in vessel 18 is then raised to a specific height, which is determined by the marking 19. By the cover 20 the container 18 is thereafter tightly closed. Through intense shaking of the vessel 18, as uniform as possible a distribution of the solids in the water is effected. If the vessel 18 is then left standing, the various grain sizes of the sample 10 sink down in the water, according to their grain size, with variable speed. From a diagram according to the Stoke's Law, or from Stoke's Law, it can be ascertained when all grain sizes larger than 0.06 or even 0.02 mm. have sunk down below the level 21, thus to below the level of the outlet socket 22, which normally is closed by a faucet 23. When the required time since the start of settling has elapsed, the faucet 23 is opened, so that from the horizon at the height of the marking 21 suspension flows out. This is collected in the measuring vessel 24 shown in FIG. 3. The vessel 24 can be filled via the tube 25 consisting of glass. The vessel 24 is filled until marking 26 is reached. Thus, a quite specific quantity of the suspension is introduced into the container 24, which is used in the subsequent calculation of the value sight. Subsequently, the measuring vessel 24, 25, which can be provided with increased buoyancy by air chambers 27, is immersed into the water bath 13 in the container 14. Then the measuring vessel 25, 24 immerses to a depth which corresponds to the under-water weight of the suspension present in the container 24, and which may be read off at the graduation scale 28. The scale can be graduated so that under-water weight of the suspended particles is read directly.

The measuring vessel 24, 25 is loaded for maintaining a vertical position, at the bottom by a supplementary weight 29. This weight is compensated for by the air chambers 27.

The mark 26 on vessel 24, 25 is the level to which the hydrometer is filled with the suspension sample. The lower end of scale 28 commences at the level at which the vessel floats when filled with water to the level 26.

The calculation of the fine material constituent in the total sample then takes place according to the formula $$x = \frac{100 \cdot s \cdot g_1}{s \cdot v - g_1} \left( \frac{V}{G} - \frac{1}{s} \right) [\%]$$

In this formula:

$V(cm.^3)$ = content of the standing vessel 18 to the characteristic marking 19.

$v(cm.^3)$ = content of the measuring vessel 24, 25 to the characteristic marking 26.

$G(g.)$ = under-water weight of the solids of the total sample 10 to be read off on the grdauation scale 17 of the measuring vessel 11.

$g_1(g.)$ = under-water weight of the solids of the suspension taken from the graduation scale 28 of the measuring vessel 24, 25.

$s(g./cm.^3)$ = specific weight of the materials, less the buoyancy of the water.

What is claimed is:

1. In a process for determination of particle size distribution in a finely divided material including particles of different sizes, with reference to a selected particle size, wherein a sample of the material is weighed, and a sample of the material is suspended in a liquid and the resulting suspension is allowed to stand for settling of suspended particles for a predetermined time whereupon a sample of predetermined volume of the suspension is taken at a definite level and the weight of the particles in said suspension sample is determined and compared with the first-mentioned weight, the improvement which comprises determining under-liquid weights as the first-mentioned and second-mentioned weights.

2. Process according to claim 1, wherein the under-liquid weights are determined by immersion weighing.

3. Process according to claim 1, wherein the particle size distribution is determined with the formula:

$$x = \frac{100 \cdot s \cdot g_1}{s \cdot v - g_1} \left( \frac{V}{G} - \frac{1}{s} \right) [\%]$$

where the variables have the meaning set forth hereinbefore.

4. Process according to claim 1, wherein:
  (a) said sample of material is placed in a vessel filling the vessel to a selected level and liquid is introduced in the vessel up to said selected level,
  (b) the vessel with said sample of the material and liquid is floated in a liquid bath,
  (c) the under-liquid weight is determined by comparison of the level of said floating with the level at which the vessel floats when filled only with said liquid up to said level.

5. Process according to claim 1, wherein the under-liquid weight of the particles in the suspension sample is determined by steps including:
  (a) providing a hydrometer partially filled with the suspension sample,
  (b) floating the hydrometer containing the suspension sample in a liquid,
  (c) determining the under-liquid weight by comparing the level of said floating with the level at which the hydrometer floats when filled with only the liquid up to said level.

6. Process according to claim 4, wherein the under-liquid weight of the particles in the suspension sample is determined by steps including:
  (a) providing a hydrometer partially filled with the suspension sample,
  (b) floating the hydrometer containing the suspension sample in a liquid,
  (c) determining the under-liquid weight of the suspended particles by comparing the level of said floating of the hydrometer with the level at which the hydrometer floats when filled with only the liquid up to said level.

7. Process according to claim 1, wherein said selected particle size is about 0.06 mm.

8. A kit for determination of particle size distribution in a finely divided material including particles of different sizes, with reference to a selected particle size, comprising:
  (a) a vessel having a level mark and a scale above and spaced from said level mark,
  (b) a settling vessel having a level mark and an outlet opening equipped with a valve below said level mark and above the bottom of the settling vessel,
  (c) a hydrometer having a level mark and a scale above and spaced from said level mark.

9. A kit according to claim 8, and a closure for the settling vessel.

References Cited

UNITED STATES PATENTS

| 2,132,015 | 10/1938 | Collins | 73—450 |
| 2,506,973 | 5/1950 | Segal | 73—450 |
| 2,699,673 | 1/1955 | Bostock | 73—432 XR |

S. CLEMENT SWISHER, *Acting Primary Examiner.*

J. W. ROSKOS, *Assistant Examiner.*